UNITED STATES PATENT OFFICE.

EDUARD LUHMANN, OF ANDERNACH, ASSIGNOR TO THE SÜRTHER MASCHINENFABRIK, VORMALS H. HAMMERSCHMIDT, OF SÜRTH, NEAR COLOGNE, GERMANY.

PROCESS OF MAKING PURE CARBONIC-ACID GAS.

SPECIFICATION forming part of Letters Patent No. 491,365, dated February 7, 1893.

Application filed August 8, 1892. Serial No. 442,509. (No specimens.)

*To all whom it may concern:*

Be it known that I, EDUARD LUHMANN, a subject of the King of Prussia, German Emperor, and a resident of Andernach-on-the-Rhine, Kingdom of Prussia, German Empire, have invented a new and useful Improved Process for Producing Pure Carbonic-Acid Gas, of which the following is an exact specification.

The invention has for its object an improved process for producing carbonic acid gas in a pure condition and is characterized by the employment of the phosphates of an alkali.

The method as hitherto used for producing carbonic acid gas from substances forming or giving off carbonic acid either by decomposition or by combustion, consists in causing the carbonic acid arising therefrom to be absorbed by a soda lye or carbonate of soda, thus forming bicarbonate of soda, and in heating the lye subsequently thereby expelling the carbonic acid gas, which is conveyed to a gasometer in order to be liquefied. This method however of forming bicarbonate and carbonate of soda is very costly, on account of the prolonged boiling required for the complete decomposition of the bicarbonate; a great amount of heat being thereby consumed in this usual process.

I have ascertained that a very convenient substitute for alkali lye and carbonate of alkali is found in the phosphates of alkali, and more particularly in the phosphate of soda. When carbonic acid proceeding from a coke furnace, or natural springs or evolved in the course of chemical processes, is led into a solution of phosphate of soda in cold water acid phosphate of soda is formed, besides bicarbonate of soda, and this mixture of acid phosphate and bicarbonate of soda is completely reconverted into phosphate of soda by the application of a moderate heat, somewhat below boiling point.

It will be obvious that phosphate of soda affords an excellent means for absorbing pure carbonic acid from impure gaseous mixtures and for liberating again this carbonic acid gas in an easy manner by the application of heat. As an example, I state the proportion in which the phosphate of soda may be used: Ten pounds of phosphate of soda ($Na_2HPO_4$) are dissolved in one hundred pounds of water, I then lead into the cold solution the impure carbonic acid (proceeding from any source) care being taken that the temperature of this said gas is as low as possible. An absorption of the carbonic acid ($CO_2$) then takes place, and the chemical reaction is represented by the equation:

$$Na_2HPO_4 + CO_2 + H_2O = NaH_2PO_4 + NaHCO_3.$$

It will be seen that acid phosphate of soda ($NaH_2PO_4$) and bicarbonate of soda ($NaHCO_3$) are formed thereby. When the chemical action is complete, the mixed solution of acid phosphate and bicarbonate of soda resulting therefrom is heated by means of a steam-coil (not perforated) the temperature employed being 212° Fahrenheit, as a maximum by the application of which heat pure carbonic acid is obtained, which is hereafter collected in a gasometer.

The chemical reaction is illustrated by the equation:

$$NaH_2PO_4 + NaHCO_3 = Na_2HPO_4 + CO_2 + H_2O;$$

that is to say the solution has returned to its initial state, and when cooled, may be used again for the absorption of impure carbonic acid gas, as described.

I wish to be understood that, although I by preference employ phosphate of soda, I do not confine myself to the employment of this salt, as I may also employ the phosphates of potash, or pyrophosphates and the like.

Having thus fully described the nature of my invention, what I desire to secure by Letters Patent of the United States is:—

1. The method of obtaining pure carbonic acid gas consisting in introducing the gases containing carbonic acid into a solution of a phosphate of alkali and in thereafter liberating the absorbed carbonic acid gas by heating the mixed solution resulting therefrom for the purpose as described.

2. The method of obtaining pure carbonic acid gas consisting in introducing the gases containing carbonic acid into a solution of a phosphate of soda and in thereafter liberating the absorbed carbonic acid gas by heating the mixed solution, resulting therefrom, for the purpose as described.

In testimony whereof I have signed this specification in the presence of two subscribing witnesses.

EDUARD LUHMANN.

Witnesses:
FRITZ SCHROEDER,
SIBILLA LANG.